(12) United States Patent
Lomax, Jr. et al.

(10) Patent No.: US 7,763,102 B2
(45) Date of Patent: Jul. 27, 2010

(54) PRESSURE SWING ADSORPTION MODULES WITH INTEGRATED FEATURES

(75) Inventors: Franklin D. Lomax, Jr., Falls Church, VA (US); Christopher Van Dyke, Washington, DC (US)

(73) Assignee: Lummus Technology Inc., Bloomfield, NJ (US)

( * ) Notice: Subject to any disclaimer, the term of this patent is extended or adjusted under 35 U.S.C. 154(b) by 329 days.

(21) Appl. No.: 11/749,496

(22) Filed: May 16, 2007

(65) Prior Publication Data

US 2008/0184890 A1  Aug. 7, 2008

Related U.S. Application Data

(60) Provisional application No. 60/888,210, filed on Feb. 5, 2007.

(51) Int. Cl.
*B01D 53/047* (2006.01)
(52) U.S. Cl. .................................................. 96/121
(58) Field of Classification Search .................. 96/121; 95/96
See application file for complete search history.

(56) References Cited

U.S. PATENT DOCUMENTS

| 4,802,899 A * | 2/1989 | Vrana et al. ................... 96/109 |
| 4,983,190 A * | 1/1991 | Verrando et al. ................ 95/11 |
| 5,549,736 A * | 8/1996 | Coffield et al. ................. 96/133 |
| 5,827,354 A * | 10/1998 | Krabiell et al. ................. 95/96 |
| 6,858,065 B2 | 2/2005 | Lomax, Jr. |
| 6,918,953 B2 | 7/2005 | Lomax, Jr. et al. |
| 2003/0188635 A1 | 10/2003 | Lomax, Jr. et al. |
| 2004/0244584 A1 | 12/2004 | Lomax et al. |

\* cited by examiner

*Primary Examiner*—Frank M Lawrence
(74) *Attorney, Agent, or Firm*—Oblon, Spivak, McClelland, Maier & Neustadt, L.L.P.

(57) ABSTRACT

A pressure swing adsorption (PSA) including a first PSA module having a first manifold, a second manifold, and a plurality of pressure vessels extending between the first manifold and the second manifold. The unit further includes at least one support member attached to one of the manifolds and configured to provide rigidity thereto. The support member is preferably made of a material different from the manifold to which it is attached. The PSA unit can also include a structure for clamping the plurality of pressure vessels between the first manifold and the second manifold without imposing a bending moment to the vessels.

29 Claims, 8 Drawing Sheets

PRESSURE SWING ADSORPTION MODULES WITH INTEGRATED FEATURES

CROSS-REFERENCE TO RELATED APPLICATION

The present application is related to U.S. Provisional Application Ser. No. 60/888,210, entitled "PRESSURE SWING ADSORPTION MODULES WITH INTEGRATED FEATURES," filed Feb. 5, 2007, which is incorporated herein by reference in its entirety.

BACKGROUND OF THE INVENTION

1. Field of the Invention

The present invention relates to pressure swing adsorption (PSA) gas separation plants, and more particularly to compact gas separation plants operating with multiple PSA modules.

2. Discussion of the Background

Pressure swing adsorption (PSA) processes are commonly used processes for the purification of gases. Exemplary applications include separation of hydrogen from gas mixtures, separation of helium from natural gas, purification of landfill gas, and air separation for production of oxygen, nitrogen and/or argon.

Large scale pressure swing adsorption (PSA) gas separation plants (~250,000 scfh) usually include one bank of 4 to 14 vessels 15-30 ft high and 6-9 ft in diameter constructed on the customer's site. The present invention covers innovative techniques for making inexpensive, compact (within standard shipping dimension) PSA plants with the ability to process as much gas as the traditional large PSA plants.

SUMMARY OF THE INVENTION

Accordingly, the present invention advantageously provides a pressure swing adsorption (PSA) including a first PSA module having a first manifold, a second manifold, and a plurality of pressure vessels extending between the first manifold and the second manifold. The unit further includes at least one support member attached to one of the manifolds and configured to provide rigidity thereto.

The support member is preferably made of a material different from the manifold to which it is attached.

The PSA unit can also include a structure for clamping the plurality of pressure vessels between the first manifold and the second manifold without imposing a bending moment to the vessels.

The present invention also advantageously provides a pressure swing adsorption unit including a first PSA module having a first manifold, a second manifold, and a plurality of pressure vessels extending between the first manifold and the second manifold. The unit includes at least one support member attached to one of the manifolds, where the support member is made of a material different from a material used to make the manifold to which it is attached.

The present invention further advantageously provides a pressure swing adsorption unit including a plurality of PSA modules each having a first manifold, a second manifold, and a plurality of pressure vessels extending between the first manifold and the second manifold. The unit including at least one support member attached to at least one of the first manifolds, where the support member is made of a material different from a material used to make the manifold to which it is attached.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
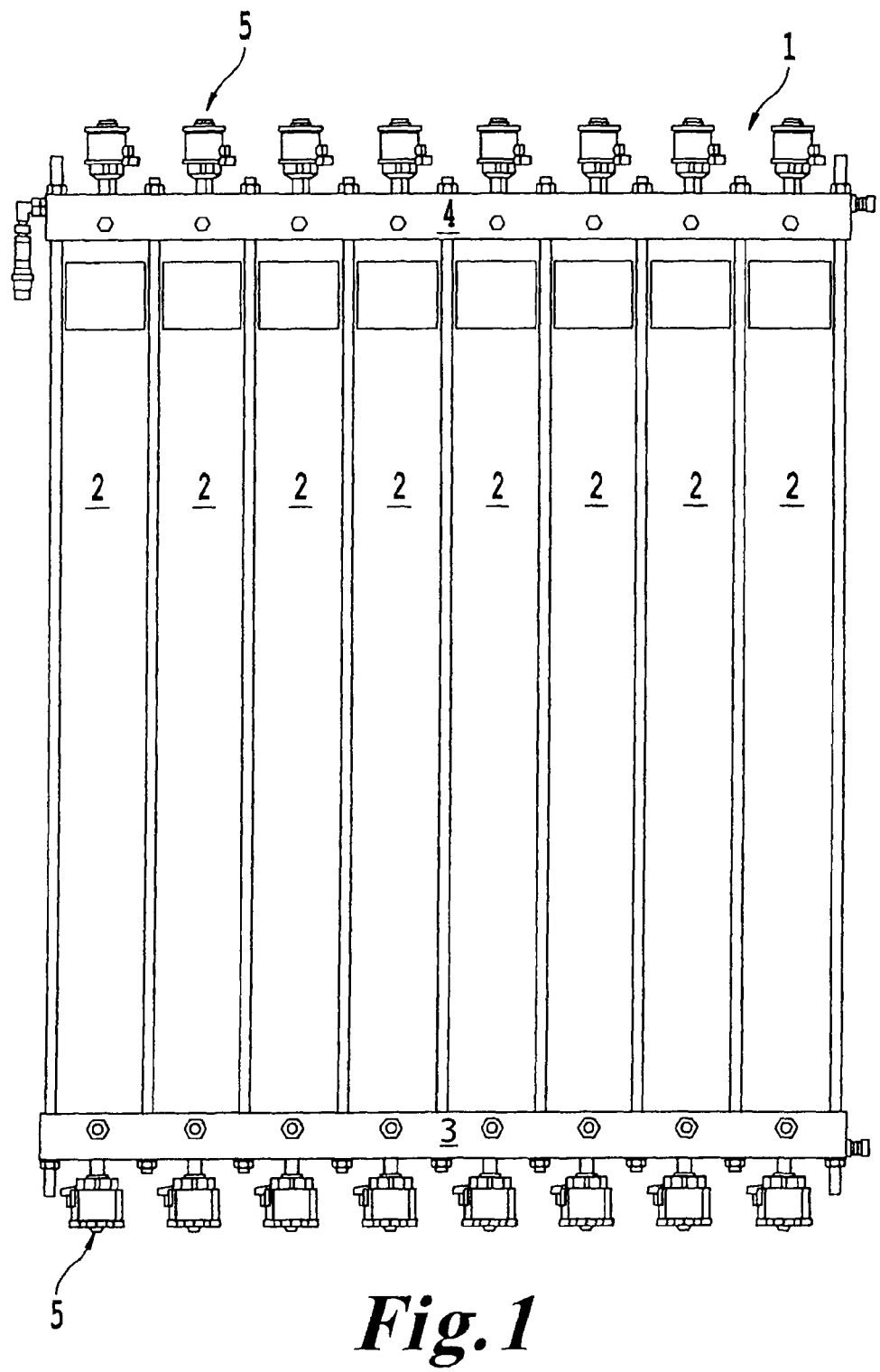
FIG. 1 depicts a related art PSA module with an array of eight vessels.

Embodiments of the present invention will be described hereinafter with reference to the accompanying drawings. In the following description, the constituent elements having substantially the same function and arrangement are denoted by the same reference numerals, and repetitive descriptions will be made only when necessary.

Earlier inventions, such as U.S. Pat. No. 6,858,065 and U.S. Pat. No. 6,918,953, which are hereby incorporated by reference in their entirety, allow a highly reliable PSA module to be constructed inexpensively for processing small amounts of gas (on the scale of 2000-10,000 scfh per module).

FIG. 1 depicts a pressure swing adsorption (PSA) module 1 with an array of eight vessels 2 extending between a bottom manifold 3 and a top manifold 4. Integrated valves 5 allow flow to be passed between vessels 2 in order to carry out the PSA process.

Figure 2:
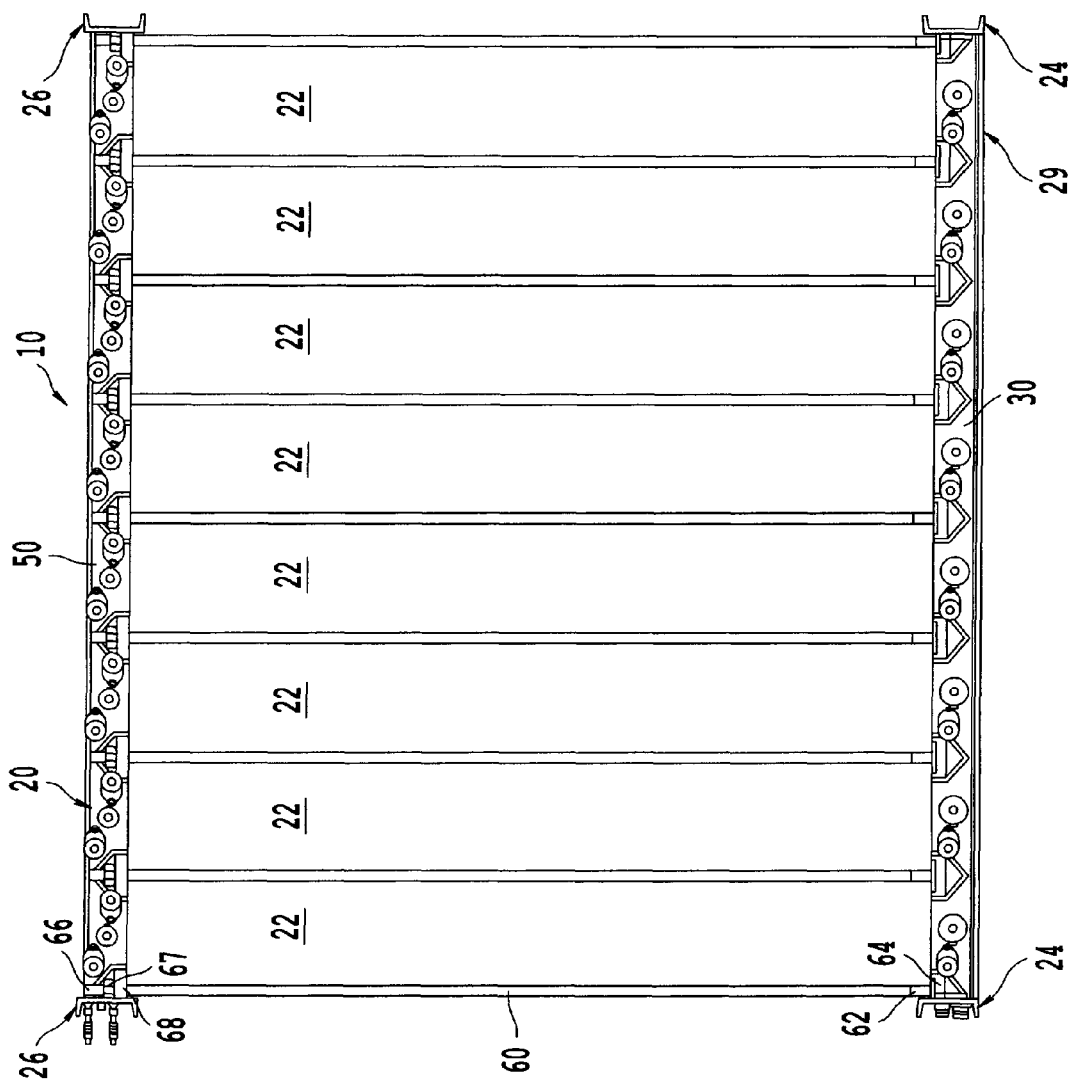
FIG. 2 is a front view of a skid package combining multiple PSA modules into a single unit according to the present invention.

FIG. 2 a front view of an embodiment of a skid package combining multiple PSA modules 20 into a single unit 10 according to the present invention. The skid package of the present invention allows for the use of PSA modules 20 configured for larger flows with larger diameter pressure vessels 22, which result in longer bottom manifolds 30 and longer top manifolds 50. While such an increase in dimensions of the pressure vessels 22 provides for greater processing capacity of the unit, such increases in dimensions of the module greatly increases the difficulty in supporting the mass of the module without engendering high stresses within the module. External support structures add cost and weight to the overall unit, and can disadvantageously reduce access to the PSA modules 20 for maintenance. The present invention advantageously uses the bottom manifold 30 and the top manifold 50 as horizontal, structural elements in combination with additional support members, and the large pressure vessels 22 as vertical, structural elements for providing greater structural integrity to the overall PSA skid package, particularly during shipment and handling without significantly increasing the cost or weight of the unit.

Figure 3:
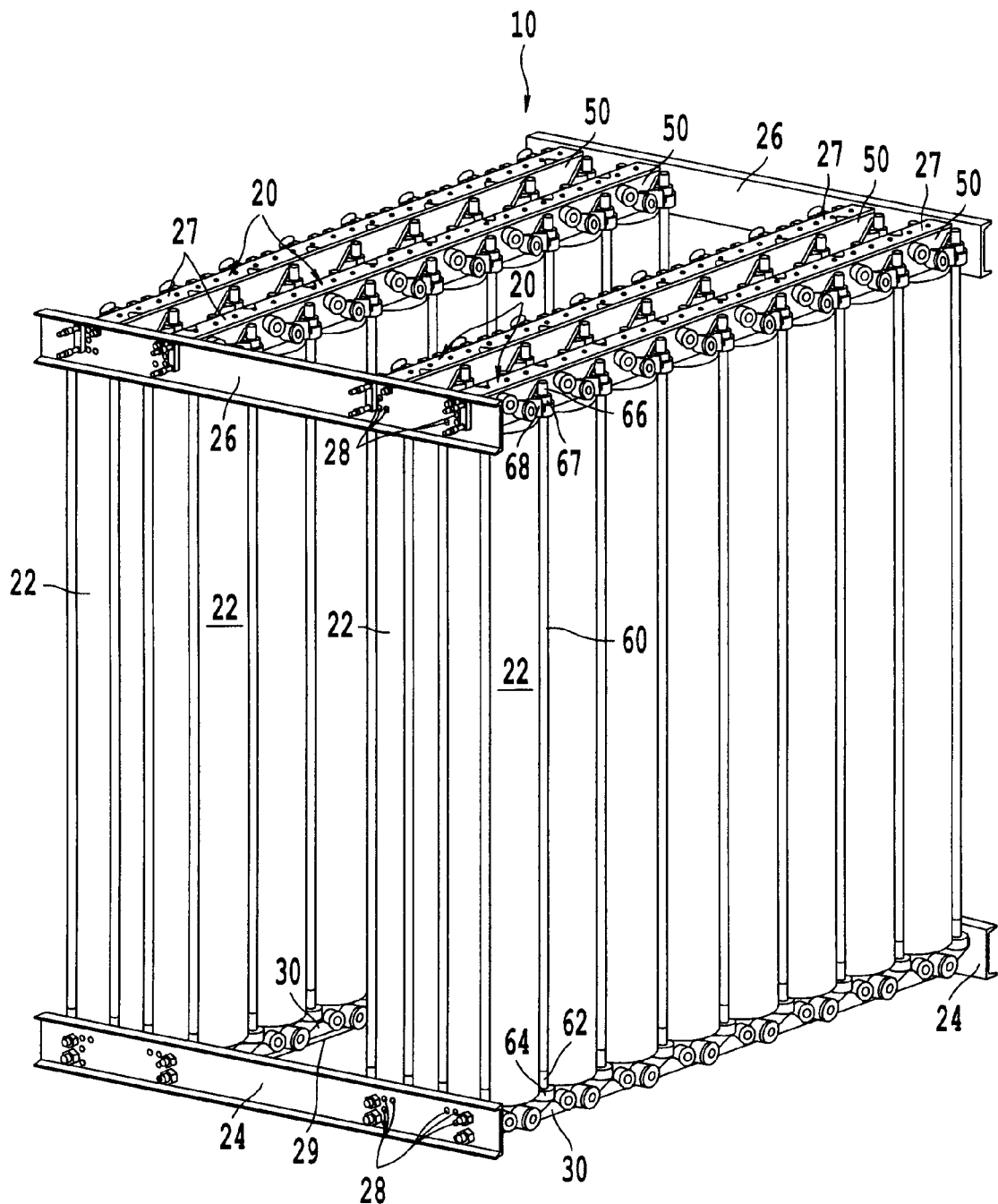
FIG. 3 is a front, left side perspective view of the unit of FIG. 2.

FIG. 3 depicts a front, left side view of the skid package of FIG. 2 combining multiple PSA modules 20 into a single unit according to the present invention. The skid package will combine multiple PSA modules 20, and the accompanying control devices and distribution piping for the PSA modules. All other non-process specific pieces can be reduced to a minimum and will mainly include brackets and bracings that serve to tie the modules together in a way that takes advantage of the structural integrity of the modules 20. Structural pieces running along the length of the modules are not necessary.

The unit 10 includes a pair of bottom horizontal braces 24 that extend essentially perpendicularly to the modules 20 and that are connected to opposing ends of the bottom manifolds 30 of each of the modules 20. The unit 10 also includes a pair of top horizontal braces 26 that extend essentially perpendicularly to the modules 20 and that are connected to opposing ends of the top manifolds 50 of each of the modules 20. Such braces 24, 26 can be fixed directly to the manifolds 30, 50 by bolts that extend through bolt holes 28 in the braces 24, 26 and are threaded directly into end faces of the manifolds 30, 50. The braces 24, 26 can also support ancillary equipment, piping, electrical controls enclosures and their related brackets and support structure. The braces 24, 26 can be fixed to the end surfaces of the manifolds through a variety of methods including, but not limited to, welding, soldering, fasteners threaded into the manifolds, and fasteners that extend through all or part of the manifolds and require a nut.

The bottom and top PSA manifolds 30, 50 may need to be constructed from special materials to combat corrosion from process gases. Such materials may suffer from low mechanical strength and/or high cost. Furthermore, such materials may not be manufactured in sufficient thickness to serve as adequate structural members. Thus, the present invention advantageously uses a support member, such as a support plate 29, attached to one or more of the bottom manifolds to provide additional support during lifting, as can best be seen in FIGS. 4 and 5. In this embodiment, the support plate 29 is attached to bottom surfaces of two bottom manifolds of two adjacent modules 20.

The support plate 29 can be made of a different material than the material used to construct the manifolds, and therefore the use of a second material for the support plate can provide a support member made from a material having greater strength and/or lower cost than the manifold material. For example, an embodiment of the present invention can be provided with a bottom manifold 30 manufactured from stainless steel, and a support plate 29 manufactured from carbon or alloy steel. As will be readily apparent to one of skill in the art based upon the above disclosure, many different combinations of materials and material properties can be used for the manifolds and the support members depending upon factors such as corrosion resistance, weight, strength, availability, cost, etc.

Figure 4:
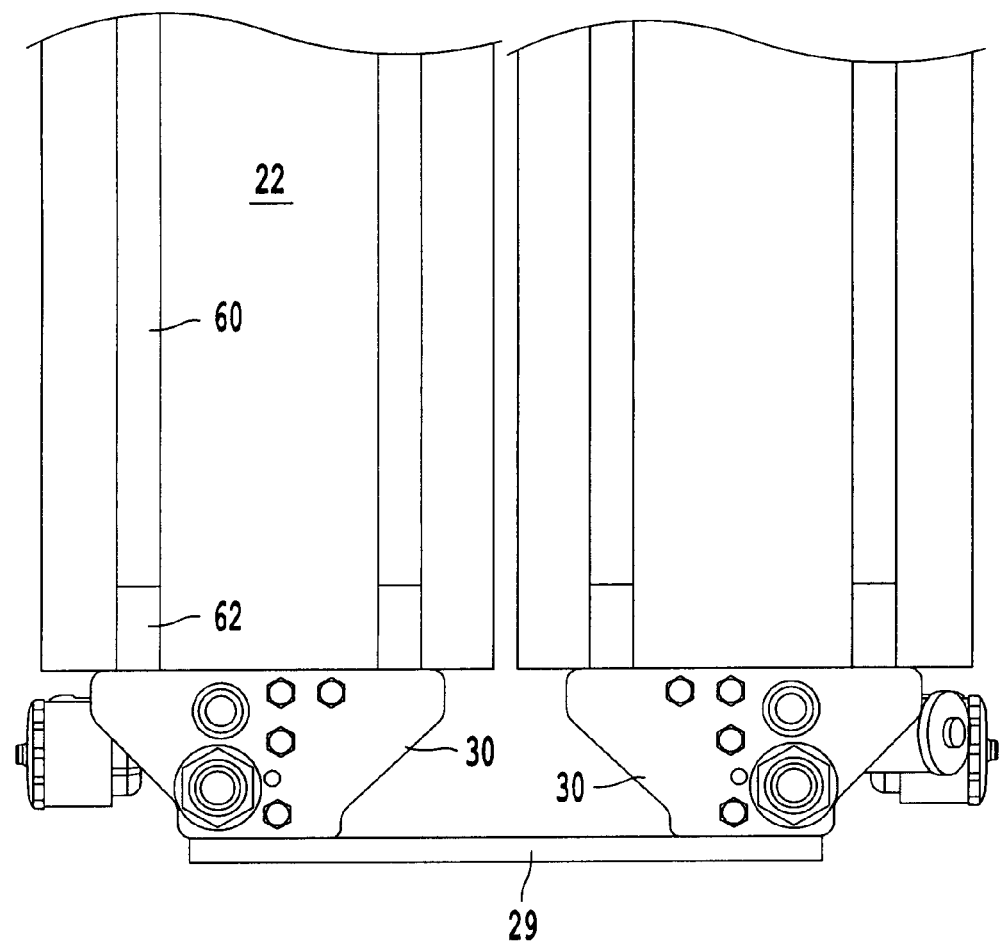
FIG. 4 is a partial, enlarged left side view of a secondary plate attached to bottom manifolds and used to tie multiple modules together to resist bending and racking.
Figure 5:
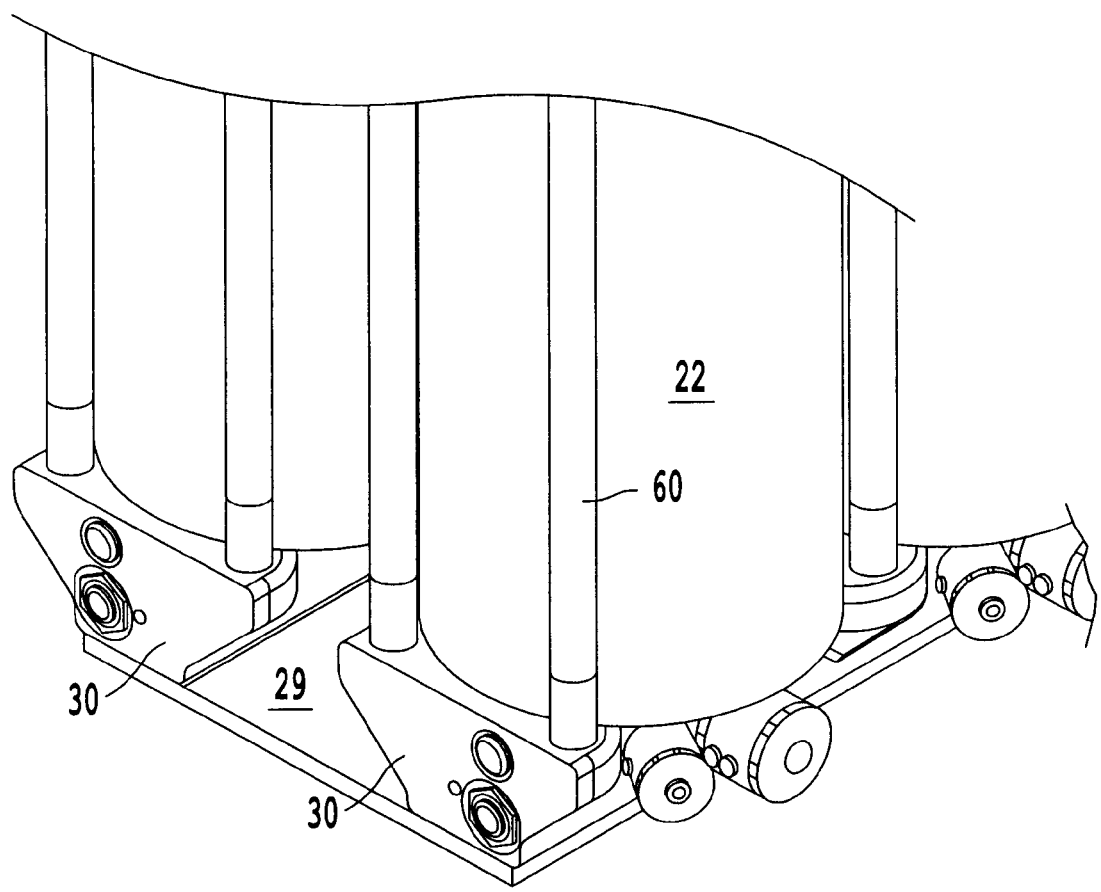
FIG. 5 is a partial, enlarged, front, left side perspective view of the secondary plate of FIG. 4.

In this embodiment, the support plate 29 is attached to the bottom manifold 30 to form a composite beam with a greatly increased moment of inertia as compared to the manifold itself. The connection between the support plate 29 and the bottom manifold 30 can be made with fasteners, adhesive, solder, braze, by welding, or by other means known in the art. One embodiment of the present invention is contemplated in which the support plate 29 is made wider than the bottom manifold 30 and attached to a single manifold. Alternatively, as depicted in FIGS. 4 and 5, another embodiment of the present invention is contemplated in which the support plate 29 is attached to multiple bottom manifolds 30 and thus used to tie multiple modules 20 together to resist racking. The support plate 29 can also be sized to reduce bearing loads between the PSA unit or plant and a foundation so that the bearing loads are below a maximum bearing stress thereof.

A top support plate 27 can also be attached to the top manifold 50 to increase the bending strength during lifting, and to provide the same advantages as the support plate 29 attached to the bottom manifold 30. Such a top support plate 27 can be used as a lifting feature only and then removed. One or more standardized top support plates can be used for lifting numerous PSA plants of the same design, thus the cost of the support plates can be advantageously reduced. The bottom support plates 29 can also be used only as a transport fixture if desired, thereby optionally further reducing their cost.

The modules 20 of the unit 10 include a plurality of vertically extending elongated members such as tie rods 60 that are used to resist separating pressure forces and also provide further stabilization against racking during transport and handling. The tie rods clamp the pressure vessels 22 between the bottom and top manifolds 30, 50 in a manner that does not impose a bending moment to the pressure vessels 22. The tie rods 60 have a threaded bottom end 62 that is threaded into a hole on a bottom bracket 64. The tie rods 60 also have a threaded top end 66 that extends through a hole in a top bracket 68 and is provided with a threaded nut 67 on the top end 66. Other retention means are possible for the tie rods, including welding, swaging, etc.

Figure 6:
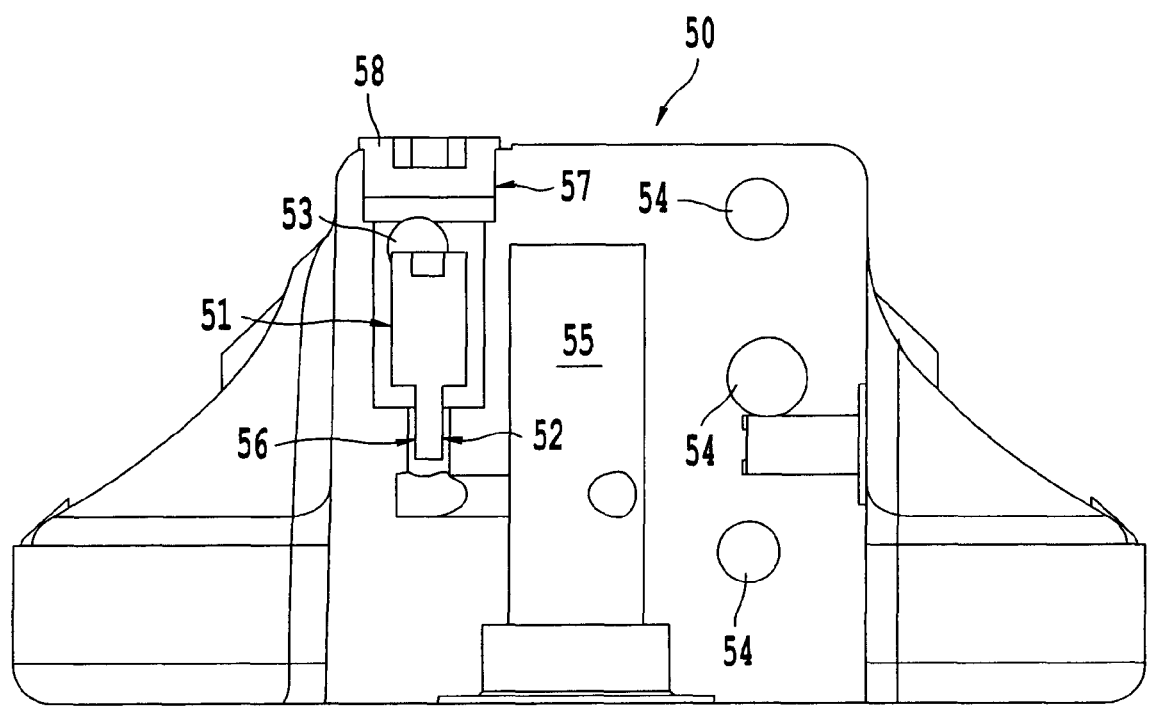
FIG. 6 is an enlarged, cross-sectional view of a top manifold of the present invention.

An embodiment of the top manifold 50 of the present invention is depicted in cross-section in FIG. 6. The top manifold 50 incorporates a pressure relief device and a pressure relief manifolding device. The pressure relief device can include burst disks, spring-loaded valves, or any other pressure relief device. For example, in the embodiment depicted in FIG. 6, the pressure relief device is an inline, spring-return valve 51. An example of such a valve 51 is an ASME-certified inline, spring-return relief valve possessing one threaded end 52. The top manifold 50 is provided with an integral press-relief manifold channel 53 that is disposed parallel to three other channels 54 provided in the PSA manifold according to U.S. Pat. No. 6,858,065, and U.S. Pat. No. 6,918,953. An inlet chamber 55 is provided between the parallel channel 53 and the individual PSA vessel 22, and provides fluid communication therebetween if the pressure relief device 51 is opened. The passage between the channel 53 and the inlet chamber 55 is provided with a feature for receiving the pressure relief device 51. In an embodiment of the present invention, the feature for receiving the pressure relief device 51 is a threaded connection 56. In other embodiments, the feature for receiving the pressure relief device 51 can alternatively be configured as a machined pocket for cartridge style valves, for pressed-fit installation, for adhesive bonding, or other means of installing a pressure relief device. The pressure relief device 51 is preferably easily removed for inspection, repair, or replacement via a port 57. The port 57, which is provided between an outer surface of the top manifold 50 and the pressure relief device 51, is made large enough for easy access. The port 57 is provided with a sealing device, such as a plug 58 or cap.

The top manifold described in U.S. Pat. No. 6,918,953 advantageously provides the following advantages: collection of product from each vessel without additional piping; simultaneous ability to equalize between any two vessels without additional piping; and simultaneous ability to equalize or purge another set of vessels without additional piping. The present invention provides the following further advantages: mounting and collection of relief gas without piping;

major component of structural integrity for entire plant; and easy integration with additional support structures.

The bottom manifold described in U.S. Pat. No. 6,918,953 advantageously provides the following advantages: distribution of feed to all vessels without additional piping; and collection of blowdown waste gas from all vessels without additional piping. The present invention provides the following further advantages: major component of structural integrity for entire plant; and easy integration with mounting plate and additional support structures.

Figure 7:
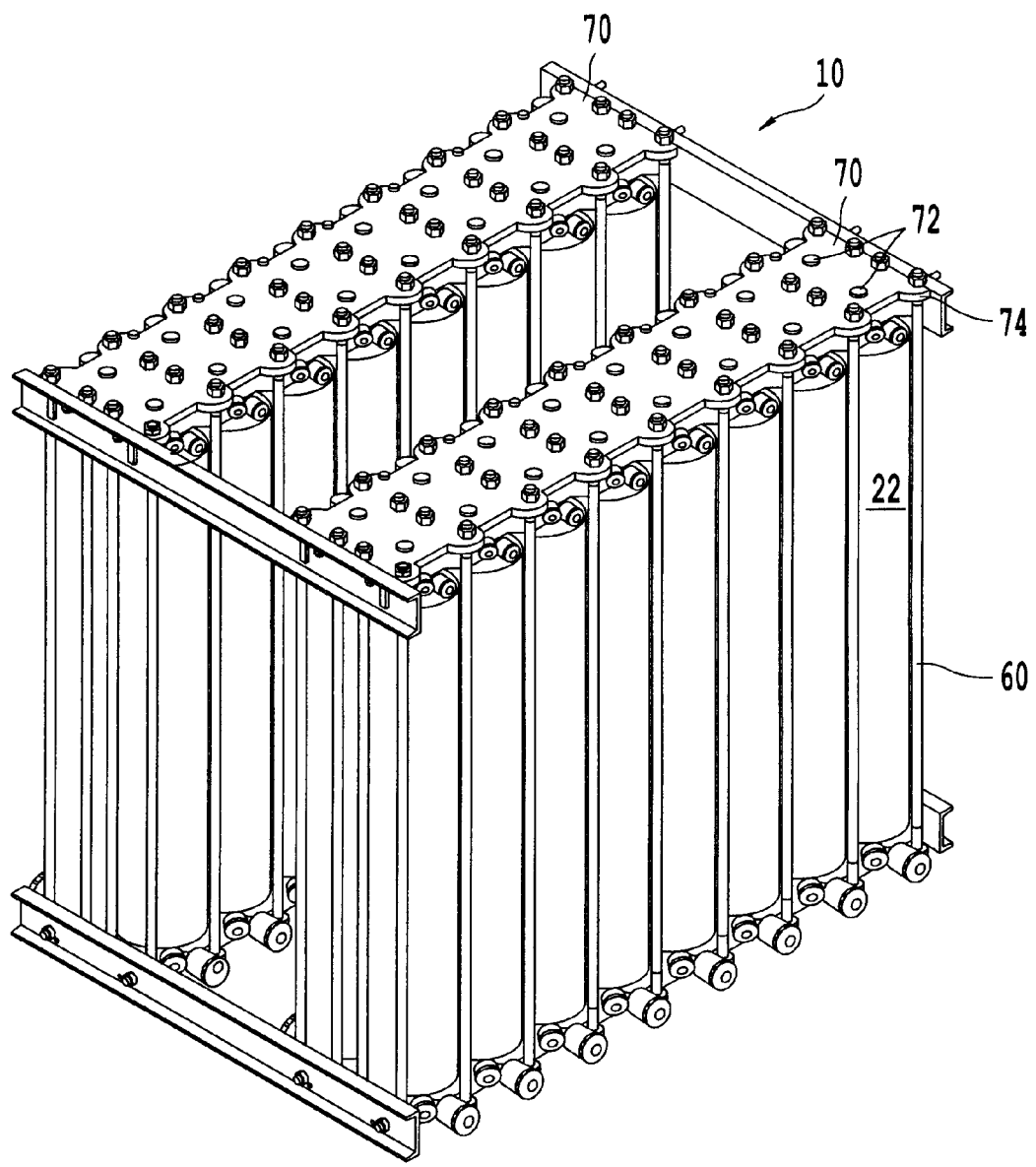
FIG. 7 is a front, left side perspective view of another embodiment of a skid package combining multiple PSA modules into a single unit according to the present invention.
Figure 9:
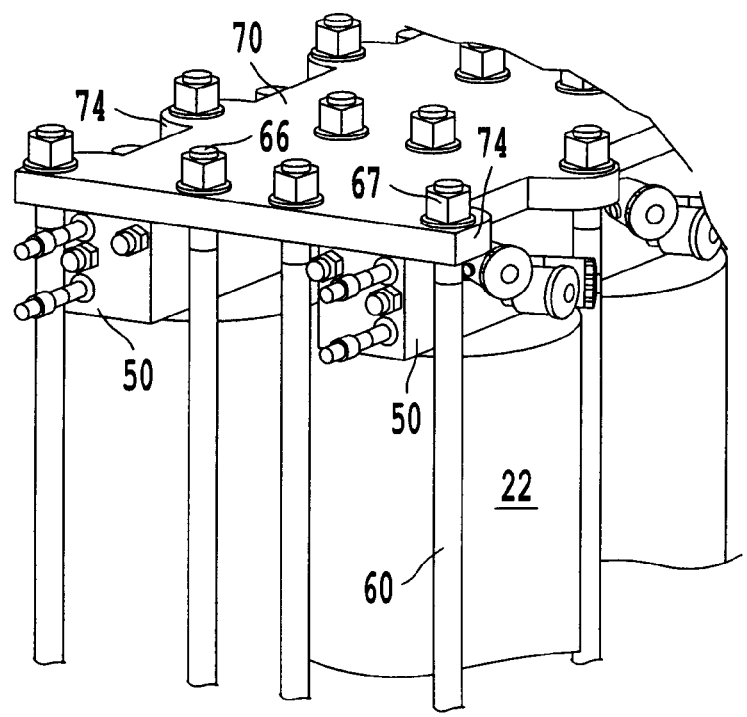
FIG. 9 is a partial, enlarged, front, left side perspective view of the top secondary plate used to tie multiple modules together according to the embodiment of FIG. 7.

FIG. 7 depicts a front, left side perspective view of another embodiment of a skid package combining multiple PSA modules into a single unit 10 according to the present invention. In this embodiment, top support plates 70 are provided that are attached to two adjacent modules. The top support plates 70 are attached to the top manifolds 50 to increase the bending strength during lifting. The top support plates 70 are provided with holes 72 in order to allow access during assembly and maintenance to features of the manifolds, such as plug 58 and port 57. FIG. 9 shows a partial, enlarged, front, left side perspective view of the top secondary plate 70 used to tie multiple modules together according to the embodiment of FIG. 7, with the top horizontal braces removed and without access holes in the plate.

Figure 8:
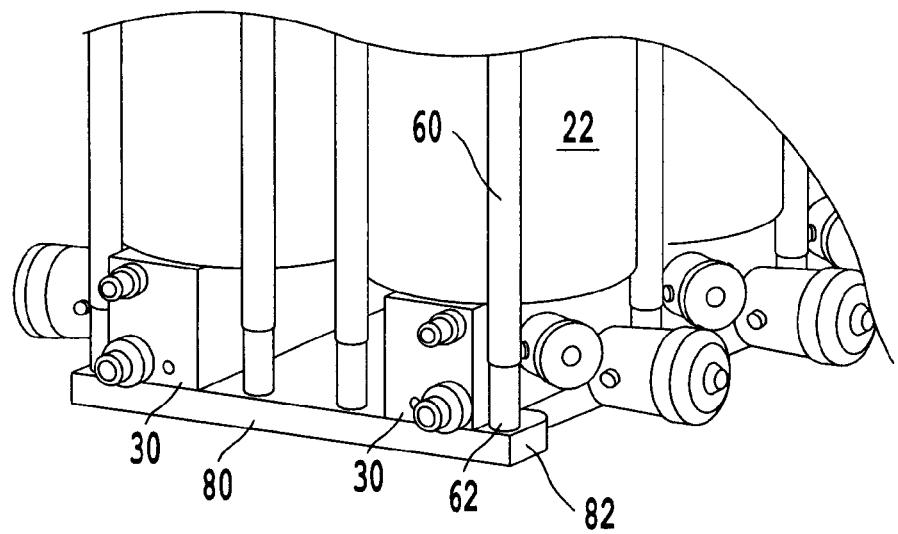
FIG. 8 is a partial, enlarged, front, left side perspective view of the bottom secondary plate used to tie multiple modules together according to the embodiment of FIG. 7.

FIG. 8 depicts a partial, enlarged, front, left side perspective view of the bottom secondary plate 80 used to tie multiple modules together according to the embodiment of FIG. 7, with the bottom horizontal braces removed. The bottom support plates 80 are attached to the bottom manifolds 30 to increase the bending strength during lifting. The plurality of vertically extending tie rods 60 are used to provide further stabilization. The tie rods clamp the pressure vessels 22 between the bottom and top manifolds 30, 50 in a manner that does not provide a bending moment to the pressure vessels 22. The tie rods 60 have a threaded bottom end 62 that is threaded into a hole on a bottom bracket 82. The tie rods 60 also have a threaded top end 66 that extends through a hole in a top bracket 74 and is provided with a threaded nut 67 on the top end 66.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A pressure swing adsorption (PSA) unit comprising:
   a first PSA module having a first manifold, a second manifold, and a plurality of pressure vessels extending, in a longitudinal direction of at least one of the plurality of vessels, between said first manifold and said second manifold; and
   a first support member attached to said first manifold or said second manifold, said first support member being configured to provide rigidity to the manifold to which it is attached,
   wherein said first support member extends in a direction transverse to the longitudinal direction of the at least one vessel,
   wherein said first support member and said manifold to which said first support member is attached comprise a composite beam that has a higher moment of inertia than a moment of inertia of the manifold to which said first support member is attached, and
   wherein said first support member is abutted to a surface of the manifold to which it is attached on a surface of the manifold opposite, in the longitudinal direction, of the plurality of pressure vessels.

2. The PSA unit according to claim 1, further comprising a second support member configured to provide rigidity, wherein said first support member is attached to said first manifold and said second support member is attached to said second manifold.

3. The PSA unit according to claim 1, wherein said first support member is made of a material different from said manifold to which said first support member is attached.

4. The PSA unit according to claim 1, wherein said first support member is made of carbon or alloy steel, and wherein said manifold to which said first support member is attached is made of stainless steel.

5. The PSA unit according to claim 1, wherein said first support member is connected to more than one PSA module.

6. The PSA unit according to claim 1, further comprising means for clamping said plurality of pressure vessels between said first manifold and said second manifold without imposing a bending moment to said plurality of pressure vessels.

7. The PSA unit according to claim 1, further comprising at least two elongated members that connect said first manifold and said second manifold, and clamp said plurality of pressure vessels therebetween.

8. The PSA unit according to claim 7, wherein said at least two elongated members are each attached at one end thereof to said first manifold and attached at another end thereof to said second manifold.

9. The PSA unit according to claim 7, wherein said at least two elongated members are each attached at one end thereof to said first support member and attached at another end thereof to said second support member.

10. A pressure swing adsorption (PSA) unit comprising:
    a first PSA module having a first manifold, a second manifold, and a plurality of pressure vessels extending between said first manifold and said second manifold; and
    a first support member attached to said first manifold or said second manifold, said first support member being configured to provide rigidity, the pressure swing adsorption (PSA) unit further comprising:
    a second PSA module having a third manifold, a fourth manifold, and a plurality of pressure vessels extending between said third manifold and said fourth manifold,
    wherein said first support member is attached to said third manifold or said fourth manifold.

11. The PSA unit according to claim 10, further comprising a second support member configured to provide rigidity, wherein said first support member is attached to said first manifold and said third manifold, and wherein said second support member is attached to said second manifold and said fourth manifold.

12. The PSA unit according to claim 10, wherein said first support member has a plurality of holes extending therethrough to allow access to said manifolds to which said first support member is attached.

13. The PSA unit according to claim 10, further comprising:
    a first brace attached to first ends of said first manifold and said third manifold;
    a second brace attached to second ends of said first manifold and said third manifold;

a third brace attached to first ends of said second manifold and said fourth manifold; and a fourth brace attached to second ends of said second manifold and said fourth manifold.

14. The PSA unit according to claim 1, wherein said first manifold and said second manifold are linearly elongated, and wherein said plurality of pressure vessels are arranged in a parallel configuration.

15. A pressure swing adsorption (PSA) unit comprising:
a first PSA module having a first manifold, a second manifold, and a plurality of pressure vessels extending, in a longitudinal direction of at least one of the plurality of vessels, between said first manifold and said second manifold; and
a first support member attached to said first manifold or said second manifold,
wherein said first support member is made of a material different from a material used to make said manifold to which said first support member is attached,
wherein said first support member extends in a direction transverse to the longitudinal direction of the at least one vessel,
wherein said first support member and said manifold to which said first support member is attached comprise a composite beam that has a higher moment of inertia than a moment of inertia of the manifold to which said first support member is attached, and
wherein said first support member is abutted to a surface of the manifold to which it is attached on a surface of the manifold opposite, in the longitudinal direction, of the plurality of pressure vessels.

16. The PSA unit according to claim 15, further comprising a second support member, wherein said first support member is attached to said first manifold and said second support member is attached to said second manifold, and wherein said second support member is made of a material different from a material used to make said second manifold.

17. The PSA unit according to claim 15, further comprising means for clamping said plurality of pressure vessels between said first manifold and said second manifold without imposing a bending moment to said plurality of pressure vessels.

18. A pressure swing adsorption (PSA) unit comprising:
a plurality of PSA modules each having a first manifold, a second manifold, and a plurality of pressure vessels extending, in a longitudinal direction of at least one of the plurality of vessels, between said first manifold and said second manifold; and
a first support member attached to at least one of said first manifolds, said first support member being made of a material different from a material used to make said at least one of said first manifolds,
wherein said first support member extends in a direction transverse to the longitudinal direction of the at least one vessel,
wherein said first support member and said manifold to which said first support member is attached comprise a composite beam that has a higher moment of inertia than a moment of inertia of the manifold to which said first support member is attached, and
wherein said first support member is abutted to a surface of the manifold to which it is attached on a surface of the manifold opposite, in the longitudinal direction, of the plurality of pressure vessels.

19. The PSA unit according to claim 18, further comprising a second support member attached to at least one of said second manifolds, said second support member being made of a material different from a material used to make said at least one of said second manifolds.

20. The PSA unit according to claim 18, further comprising means for clamping said plurality of pressure vessels between said first manifold and said second manifold without imposing a bending moment to said plurality of pressure vessels.

21. A pressure swing adsorption (PSA) unit comprising:
a first PSA module having a first manifold, a second manifold, and a plurality of pressure vessels extending between said first manifold and said second manifold,
wherein said first manifold includes:
a manifold channel;
a plurality of passages connecting said manifold channel with said plurality of pressure vessels; and
plurality of pressure relief devices provided in said plurality of passages,
wherein a pressure vessel of said plurality of pressure vessels is in fluid communication with said manifold channel upon opening of a respective pressure relief device of said plurality of pressure relief devices.

22. The PSA unit according to claim 21, wherein said manifold channel is separate from channels in said manifold that are used during operation of a PSA cycle in said PSA unit.

23. The PSA unit according to claim 21, wherein said plurality of pressure relief devices are burst disks.

24. The PSA unit according to claim 21, wherein said plurality of pressure relief devices are spring-loaded valves.

25. The PSA unit according to claim 21, wherein said first manifold further includes a plurality of ports extending between an outer surface of said first manifold and said plurality of pressure relief devices.

26. The PSA unit according to claim 25, wherein said first manifold further includes a plurality of sealing devices provided with said plurality of ports.

27. The PSA unit according to claim 25, further comprising a first support member attached to said first manifold, wherein said first support member is configured to allow access to said plurality of ports.

28. The PSA unit according to claim 21, further comprising a first support member attached to said first manifold or said second manifold.

29. The PSA unit according to claim 28, wherein said first support member is made of a material different from a material used to make said manifold to which said first support member is attached.

* * * * *